United States Patent
Carter

(10) Patent No.: US 6,361,057 B1
(45) Date of Patent: Mar. 26, 2002

(54) WHEELED PLATFORM FOR ERECTABLE CANOPY SHELTER

(76) Inventor: Mark C. Carter, 1601 Iowa Ave., Riverside, CA (US) 92507

( * ) Notice: Subject to any disclaimer, the term of this patent is extended or adjusted under 35 U.S.C. 154(b) by 0 days.

(21) Appl. No.: 09/626,405

(22) Filed: Jul. 26, 2000

(51) Int. Cl.⁷ .................................................. B62B 1/00
(52) U.S. Cl. .................. 280/63; 280/47.23; 280/47.24; 135/912
(58) Field of Search ................................. 280/63, 47.23, 280/47.24, 47.131, 47.17, 47.27, 79.11, 79.7, 79.2; 135/912

(56) References Cited

U.S. PATENT DOCUMENTS

| | | | |
|---|---|---|---|
| 1,422,730 A | * 7/1922 | Wood | |
| 3,105,698 A | * 10/1963 | Bonarrigo et al. | |
| 3,586,345 A | * 6/1971 | Nall | ......................... 280/47.13 |
| 4,166,638 A | 9/1979 | De Prado | |
| 4,865,340 A | * 9/1989 | Mortenson | ............... 280/47.27 |
| 4,896,897 A | 1/1990 | Wilhelm | |
| 5,248,157 A | * 9/1993 | Rice | ......................... 280/47.131 |
| 5,299,816 A | 4/1994 | Vom Braucke et al. | |
| 5,397,151 A | * 3/1995 | Jserng | ......................... 280/654 |
| 5,487,551 A | * 1/1996 | Kennedy | ................. 280/47.19 |
| 5,577,744 A | 11/1996 | Parks | |
| 5,924,832 A | * 7/1999 | Rice | |
| 6,109,644 A | * 8/2000 | Cox | ........................... 280/652 |

FOREIGN PATENT DOCUMENTS

| | | | | |
|---|---|---|---|---|
| CH | 217650 | * | 10/1942 | .............. 280/47.27 |
| DE | 818775 | * | 7/1949 | .............. 280/47.27 |
| GB | 734543 | * | 8/1955 | .............. 280/47.24 |
| GB | 894253 | * | 4/1962 | |
| JP | 404317856 | * | 11/1992 | .............. 280/79.11 |

* cited by examiner

Primary Examiner—Robert Canfield
(74) Attorney, Agent, or Firm—Fulwider Patton Lee & Utecht, LLP

(57) ABSTRACT

A wheeled platform is provided for transportation of a quickly erectable shelter having a plurality of legs, and for receiving at least two of the plurality of legs of the shelter for transportation of the shelter. The wheeled platform includes a plate member having a lower foot portion, a pair of posts mounted to the plate member for adapted to be received in the lower ends of the legs of the shelter, and a pair of wheels rotatably mounted to the plate member. The plate member comprises a right angle plate having a lower foot portion and a support wall portion connected to the foot portion and extending at approximately a right angle from the foot portion, with the pair of wheels rotatably mounted to the support wall portion.

1 Claim, 3 Drawing Sheets

WHEELED PLATFORM FOR ERECTABLE CANOPY SHELTER

BACKGROUND OF THE INVENTION

1. Field of the Invention

This invention relates generally to carriers and wheeled platforms, and more particularly relates to a carrier or wheeled platform for collapsible canopy shelter structures.

2. Description of Related Art

Temporary shelters that can be easily transported and rapidly set up can be particularly useful in providing temporary care and housing. Such shelters can also be useful for non-emergency outdoor gatherings, such as for retail fairs, temporary military posts, field trips, and the like. One known quickly erectable, collapsible shelter includes a framework of X-shaped linkages, telescoping legs, and a canopy covering the framework. The legs of that shelter are capable of telescoping to about twice their stowed length, and the framework of X-shaped truss pairs is capable of horizontal extension between the legs to support a canopy. The framework can be constructed of lightweight material, and the telescoping legs can be extended to raise the framework of the shelter.

In order to increase the portability and versatility of such temporary shelters, it is important that they can be readily transported, such as for short distances to or from a vehicle or storage facility, for example, and to or from a location where the shelter is to be erected. It would be desirable to provide a carrier allowing a single person to transport such a temporary shelter without requiring the lifting and carrying of the shelter, and particularly for larger and heavier quickly erectable shelter structures, such a carrier can be essential for a single person to transport such a shelter structure.

There thus remains a need for carrier that can be utilized by one or more users for transporting such lightweight canopy shelters. The present invention meets these and other needs.

SUMMARY OF THE INVENTION

Briefly, and in general terms, the present invention provides a wheeled platform for transportation of a quickly erectable shelter having a plurality of legs, and for receiving at least two of the plurality of legs of the shelter for transportation of the shelter. In a presently preferred embodiment, the wheeled platform comprises a plate member having a lower foot portion, a pair of posts being mounted to the plate member for adapted to be received in the lower ends of the legs of the shelter, and a pair of wheels rotatably mounted to the plate member. In a presently preferred aspect, the plate member comprises a right angle plate having a lower foot portion and a support wall portion connected to the foot portion and extending at approximately a right angle from the foot portion. A pair of wheels are rotatably mounted to the support wall portion. When thus used, the invention can be combined with the shelter itself to allow easy movement of the shelter on the wheels, which is particularly advantageous compared to carrying the shelter, as is ordinarily done.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
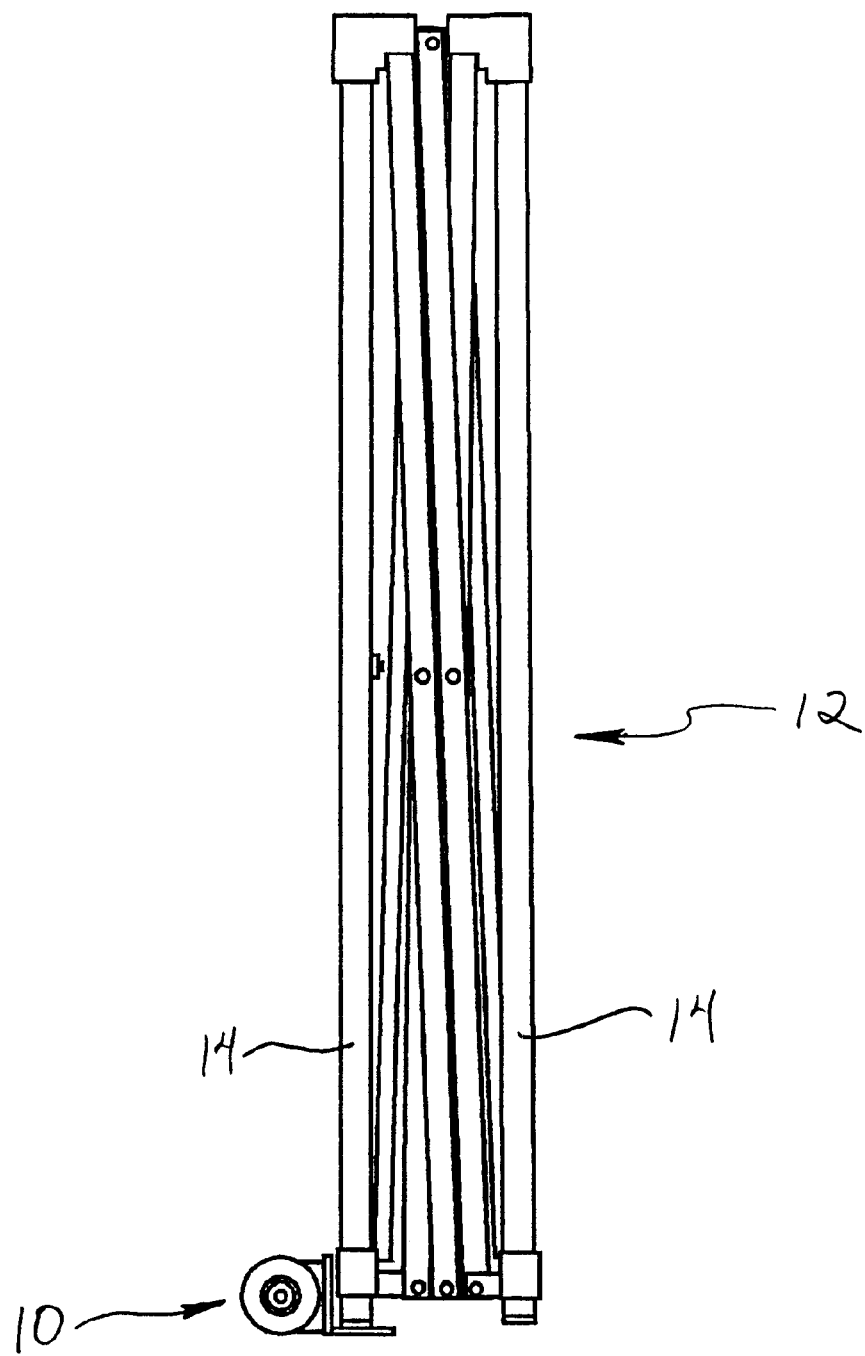
FIG. 1 is a side elevational view of a quickly erectable canopy shelter loaded on a wheeled platform according to the invention.
Figure 2:
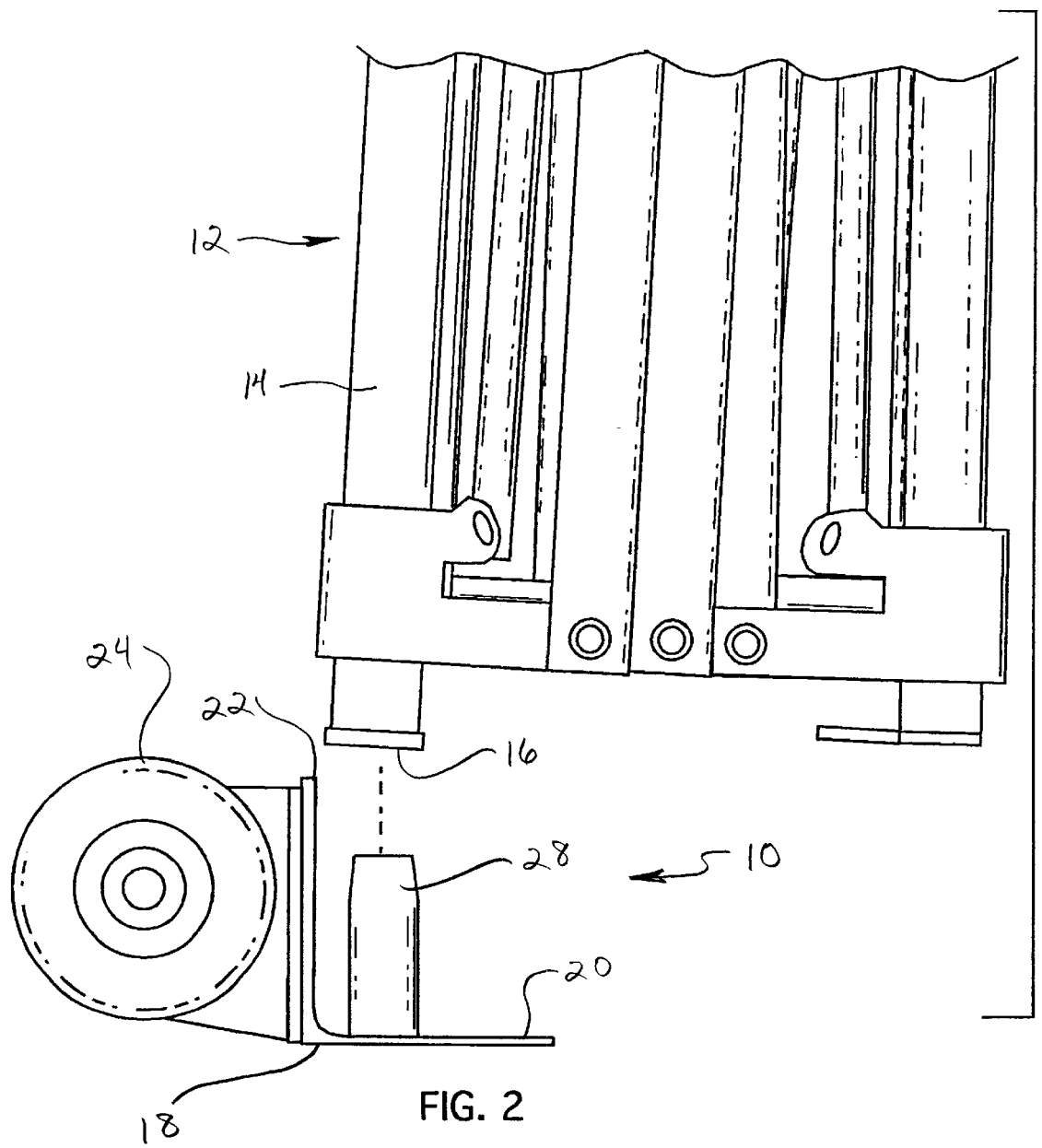
FIG. 2 is an exploded view of a lower portion of FIG. 1, showing the loading of the shelter onto the wheeled platform of the invention.
Figure 3:
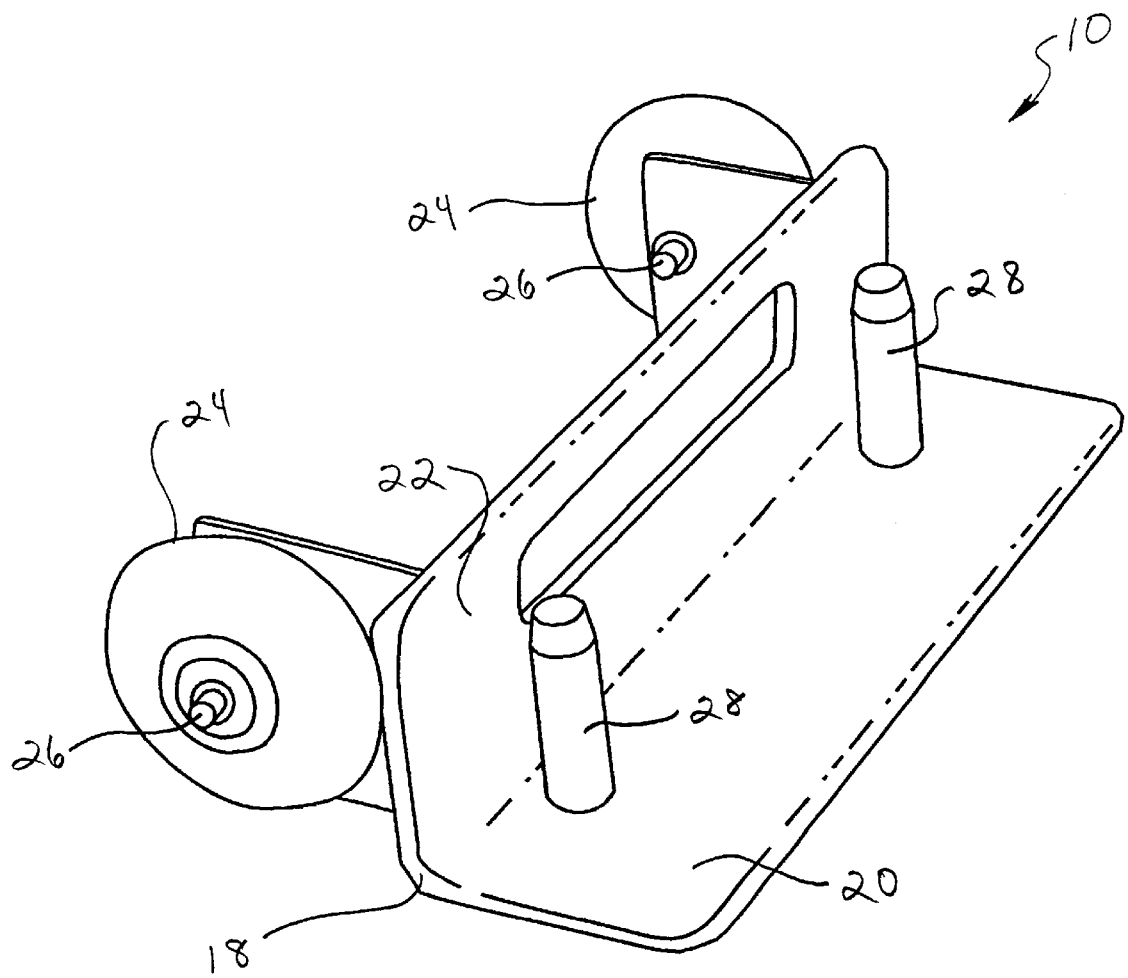
FIG. 3 is a top perspective view of the wheeled platform of FIG. 1.

As is illustrated in the drawings, in a first presently preferred embodiment, the invention provides for a wheeled platform 10 for a quickly erectable canopy shelter 12 having a plurality of legs 14, as shown in FIGS. 1 and 2, showing the quickly erectable canopy shelter of the invention in a folded, unexpended configuration for loading onto the wheeled platform of the invention for convenient transportation of the shelter. The lower ends of the legs are preferably hollow and each have an opening 16 for registering with and mounting on the wheeled platform. In a currently preferred embodiment, the wheeled platform includes a right angle plate 18 having a lower foot portion 20 and support wall portion 22 connected to and extending at approximately a right angle from the foot portion. The right angle plate is currently preferably formed of a metal, such as steel or aluminum, but may also be formed of other rigid materials, such as plastic, for example. A pair of wheels 24 are rotatably mounted to the support wall portion, such as by axles 26, or alternatively by a common axle, and the foot portion includes a pair of upright posts 28 which are adapted register with and to be received in the openings 16 at the lower ends of two adjacent legs, for loading of the quickly erectable canopy shelter onto the foot portion of the wheeled platform, particularly when the shelter is in a folded configuration.

It should be understood that the wheeled platform of the invention can readily be used for the convenient transportation of other articles such as chairs or tables with openings in the lower ends of the legs, or a wide variety of apparatus, devices and equipment, such as boxes, crates, chests, luggage, and heavier items such as laundry equipment, televisions, refrigerators, and the like, that can be provided with appropriate apertures for registering and loading onto the posts of the wheeled platform for convenient manual transportation over short distances. As can be readily imagined, the utility of the invention is greatly increased when the object to which is attached is large, heavy or of an odd shape, thus rendering the object more difficult to move by carrying the object by hand.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A wheeled platform for transportation of a quickly erectable shelter having a plurality of legs, and for receiving at least two of said plurality of legs of said shelter for transportation of said shelter, the lower ends of said legs having apertures defined therein, said wheeled platform comprising:

a right angle plate member having a lower foot portion and a support wall portion, said support wall portion being connected to said foot portion and extending at approximately a right angle from said foot portion;

a pair of posts being mounted to said plate member adapted to be received in the apertures in the lower ends of the legs of the shelter; and a pair of wheels rotatably mounted to said support wall portion of said plate member.

* * * * *